US011423058B2

(12) United States Patent
Muehge et al.

(10) Patent No.: US 11,423,058 B2
(45) Date of Patent: Aug. 23, 2022

(54) CLASSIFYING AND FILTERING DATA FROM A DATA STREAM

(71) Applicant: International Business Machines Corporation, Armonk, NY (US)

(72) Inventors: Thorsten Muehge, Budenheim (DE); Frank Krick, Ockenheim (DE); Erik Rueger, Ockenheim (DE); Michael Diederich, Mainz (DE); Christoph Roth, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 17/031,983

(22) Filed: Sep. 25, 2020

(65) Prior Publication Data
US 2022/0100779 A1 Mar. 31, 2022

(51) Int. Cl.
G06F 16/28 (2019.01)
G06F 16/2455 (2019.01)
G06N 3/08 (2006.01)
G06F 13/20 (2006.01)
G06N 3/04 (2006.01)

(52) U.S. Cl.
CPC ............ *G06F 16/285* (2019.01); *G06F 13/20* (2013.01); *G06F 16/24568* (2019.01); *G06N 3/04* (2013.01); *G06N 3/08* (2013.01); *G06F 2213/40* (2013.01)

(58) Field of Classification Search
CPC .. G06F 16/285; G06F 16/24568; G06F 13/20; G06F 2213/40; G06N 3/04; G06N 3/08

USPC ........................................................ 707/739
See application file for complete search history.

(56) References Cited

U.S. PATENT DOCUMENTS

| 9,917,597 | B1 | 3/2018 | Cutter |
| 10,460,416 | B1 | 10/2019 | Sirasao |
| 10,482,376 | B1 * | 11/2019 | Vaze ...................... G06N 20/00 |
| 10,552,739 | B1 * | 2/2020 | Rausch ...................... G06F 9/30 |
| 10,931,588 | B1 * | 2/2021 | Matthews ............... H04L 47/25 |
| 2004/0068475 | A1 | 4/2004 | Depold |
| 2012/0054184 | A1 * | 3/2012 | Masud .................. G06F 16/285 707/737 |
| 2015/0199410 | A1 | 7/2015 | Redlich |

(Continued)

OTHER PUBLICATIONS

Schemmel et al., "An Accelerated Analog Neuromorphic Hardware System Emulating NMDA- and Calcium-Based Non-Linear Dendrites", arXiv:1703.07286v1 [cs.NE] Mar. 21, 2017, 10 pages.

(Continued)

*Primary Examiner* — Evan Aspinwall
(74) *Attorney, Agent, or Firm* — Jared L. Montanaro

(57) ABSTRACT

Methods, computer program products, devices, and/or systems are provided that perform the following operations: receiving data from an incoming data stream; separating the data into data chunks and storing the data chunks in accordance with a selection configuration matrix in a set of different matrix buffers until the matrix buffers are filled up; processing the data chunks by multiple processing units, each processing unit associated to a matrix buffer of the matrix buffers via an I/O block; providing the processed data chunks as inputs to a neural network component; and classifying the data and filtering the data based on a classification of the data by the neural network component.

20 Claims, 6 Drawing Sheets

(56) References Cited

U.S. PATENT DOCUMENTS

| | | |
|---|---|---|
| 2018/0307979 A1 | 10/2018 | Selinger |
| 2019/0171365 A1 | 6/2019 | Power |
| 2019/0243771 A1 | 8/2019 | Mittal |
| 2019/0250839 A1 | 8/2019 | Bedadala |
| 2020/0104690 A1* | 4/2020 | Bai ................... G06F 9/30098 |
| 2020/0387797 A1* | 12/2020 | Ryan ..................... G06N 3/088 |
| 2021/0012178 A1* | 1/2021 | Venkatesh ............... G06F 17/16 |
| 2021/0158171 A1* | 5/2021 | Rausch ................... G06N 3/04 |

OTHER PUBLICATIONS

"Classifying and Filtering Data From a Data Stream", International Application No. PCT IB2021/058304, filed on Sep. 13, 2021, 27 pages.

"Patent Cooperation Treaty PCT International Search Report and Written Opinion of the International Searching Authority", International application No. PCT/IB2021/058304, International filing date Sep. 13, 2021, dated Dec. 24, 2021, 6 pages.

* cited by examiner

CLASSIFYING AND FILTERING DATA FROM A DATA STREAM

BACKGROUND

The present disclosure relates generally to data processing systems, and more particularly, to devices, methods, computer program products, and data processing systems for classifying and filtering data from a data stream.

With the drastically increasing amount of data due to, for example, Internet of Things (IoT) devices or social media, challenges towards data storage are generally increasing. On the one hand, the storage of this massive amount of data is a challenge by itself, on the other hand, machine learning algorithms may generally be needed to analyze data streams in real time and to react in real time with a very high level of confidence.

SUMMARY

According to an aspect of the present invention, there is a computer-implemented method, computer program product, device, and/or system that performs the following operations (not necessarily in the following order): receiving data from an incoming data stream; separating the data into data chunks and storing the data chunks in accordance with a selection configuration matrix in a set of different matrix buffers until the matrix buffers are filled up; processing the data chunks by multiple processing units, each processing unit associated to a matrix buffer of the matrix buffers via an I/O block; providing the processed data chunks as inputs to a neural network component; and classifying the data and filtering the data based on a classification of the data by the neural network component.

BRIEF DESCRIPTION OF THE SEVERAL VIEWS OF THE DRAWINGS

The present disclosure, together with the above-mentioned and other objects and advantages, may best be understood from the following detailed description of the embodiments but is not restricted to the described embodiments.

DETAILED DESCRIPTION

Figure 1:
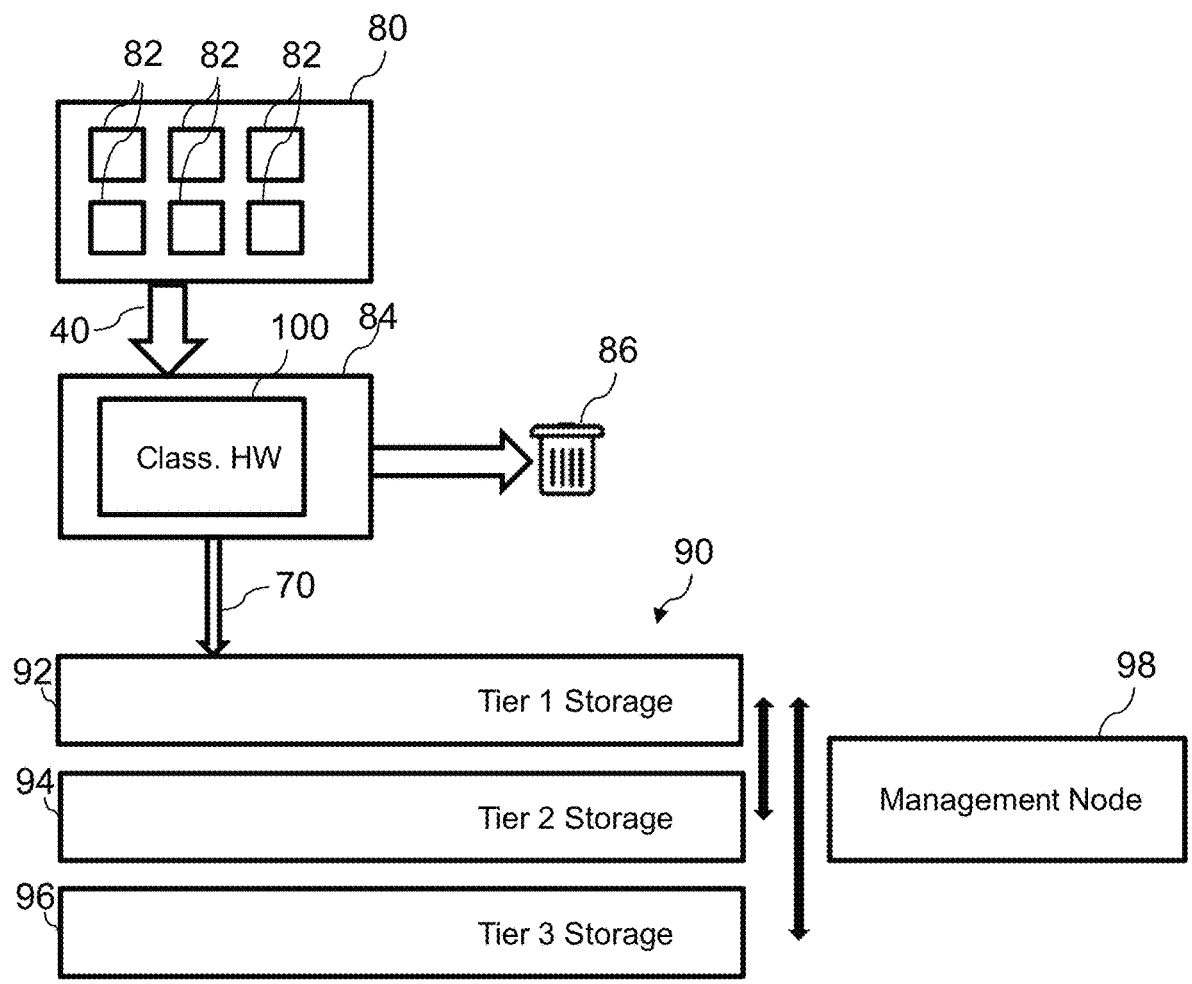
FIG. 1 depicts a schematic outline of a high performance data analysis system with a device for filtering data from a data stream, according to an embodiment of the invention.

According to aspects of the present disclosure, devices, systems, and methods can be provided to allow for high performance classifying and filtering of big data streams. In particular, devices, systems, and methods of the present disclosure can provide for a classification unit that receives incoming data streams and performs classification of the incoming data in real-time. Based on the classifications, data from the data streams can be labelled (e.g., metadata) and sent for storage, for example to back-end parallel storage, or data can be discarded (e.g., data that has little or no relevance, etc.). In some embodiments, for data that is to be stored, the data can be moved to an appropriate storage tier of a storage system based on the labelling (e.g., metadata) from the classification. More particularly, embodiments of systems, and methods of the present disclosure can provide for processing the data from the incoming data streams to prepare the data for analysis and then provide for analysing the data, for example, via a neural net, to perform classification and filtering of the data to allow for storage of the data as appropriate.

With the drastically increasing amount of data due to, for example, Internet of Things (IoT) devices or social media, challenges towards data storage are generally increasing. On the one hand, the storage of this massive amount of data is a challenge by itself, on the other hand, machine learning algorithms may generally be needed to analyze data streams in real time and to react in real time with a very high level of confidence.

Generally, some storage solutions can provide options to store and read the information of multiple clients to backend storage in parallel. The backend storage can be a mixture of multiple storage types like SSDs, HDDs and tape, for example. The tiering between the different storage types can be managed automatically and may be invisible to the multiple hosts.

In the case of very large data volumes, for example, in the range of terabytes per seconds, typical storage solutions, such as outlined above, may be reaching their limit. To store the data first and subsequently perform the analysis may not be suitable, because this may consume far too much storage capacity. Hence, some solutions may perform the initial data classification within the sensor.

Parallel file system solutions may not be optimized to cope with ultra large data streams, where in fact potentially only a small subset of this data is really worth keeping. Some storage technology may operate in such that all the data is first stored, for example, on a data pool. After storage, the host may scan the new (stored) data, for example with machine learning algorithms, and then potentially trigger an action based on the subsequent classification results.

Thus, in many such cases, 100% of the data may be initially stored even though only a very small subset of the data might be of relevance. Additionally, the sequence of storing data and subsequently analyzing the stored data might be too slow for many real time applications.

Further, in-sensor classification solutions may not scale effectively with the number of sensors. Multiple sensors may be difficult to manage and real time synchronized classification for a set of multiple sensors may be very difficult or even impossible.

The shared bus between the program memory and data memory can lead to the so-called von Neumann bottleneck, the limited throughput (data transfer rate) between the central processing unit (CPU) and memory compared to the amount of memory. Because the single bus can only access one of the two classes of memory at a time, throughput is lower than the rate at which the CPU can work. This may seriously limit the effective processing speed when the CPU is required to perform minimal processing on large amounts of data. The CPU may be continually forced to wait for needed data to move to or from memory. Since CPU speed and memory size have increased much faster than the throughput between them, the bottleneck has generally become more of a problem, a problem whose severity may further increase with every new generation of CPU.

In the drawings, like elements are referred to with equal reference numerals. The drawings are merely schematic representations, and not intended to portray specific parameters of the invention. Moreover, the drawings are intended to depict only example embodiments of the invention and therefore should not be considered as limiting the scope of the invention.

FIG. 1 depicts a schematic outline of a high-performance data analysis system with a device 100 for filtering data from a data stream 40 according to an embodiment of the invention. In accordance with aspects of the present disclosure, the device 100 includes a novel data pre-processing unit and a subsequent neuromorphic classification unit.

A data acquisition unit 80 with a multitude of sensors 82 delivers a data stream 40 to a server 84, which comprises a device 100 for receiving the data stream 40, classifying the data, and transferring the filtered data 70 to a hierarchical storage device 90. The storage device 90 may comprise different tier storages 92, 94, 96 for short term storage, middle term storage, and long term storage of data, respectively. The storage device 90 is managed by a management node 98, which transfers data between the different tier storages 92, 94, 96.

The filtered-out data 86 may be directly sorted out from the data stream 40 (e.g., not stored to hierarchical storage device 90). The filtered-out data 86 may include data from the data stream 40 that is determined to have little to no relevance, and thus, does not warrant being stored to hierarchical storage device 90.

The data stream 40 comprises data from multiple sensors 82 (e.g., associated with Internet of Things (IoT) devices, etc.). The data from each sensor 82 comprises meta data and load data, the meta data being related to the sensor 82 and the load data. The meta data comprises a sensor identifier, a sensor class, and a data identifier.

Figure 2:
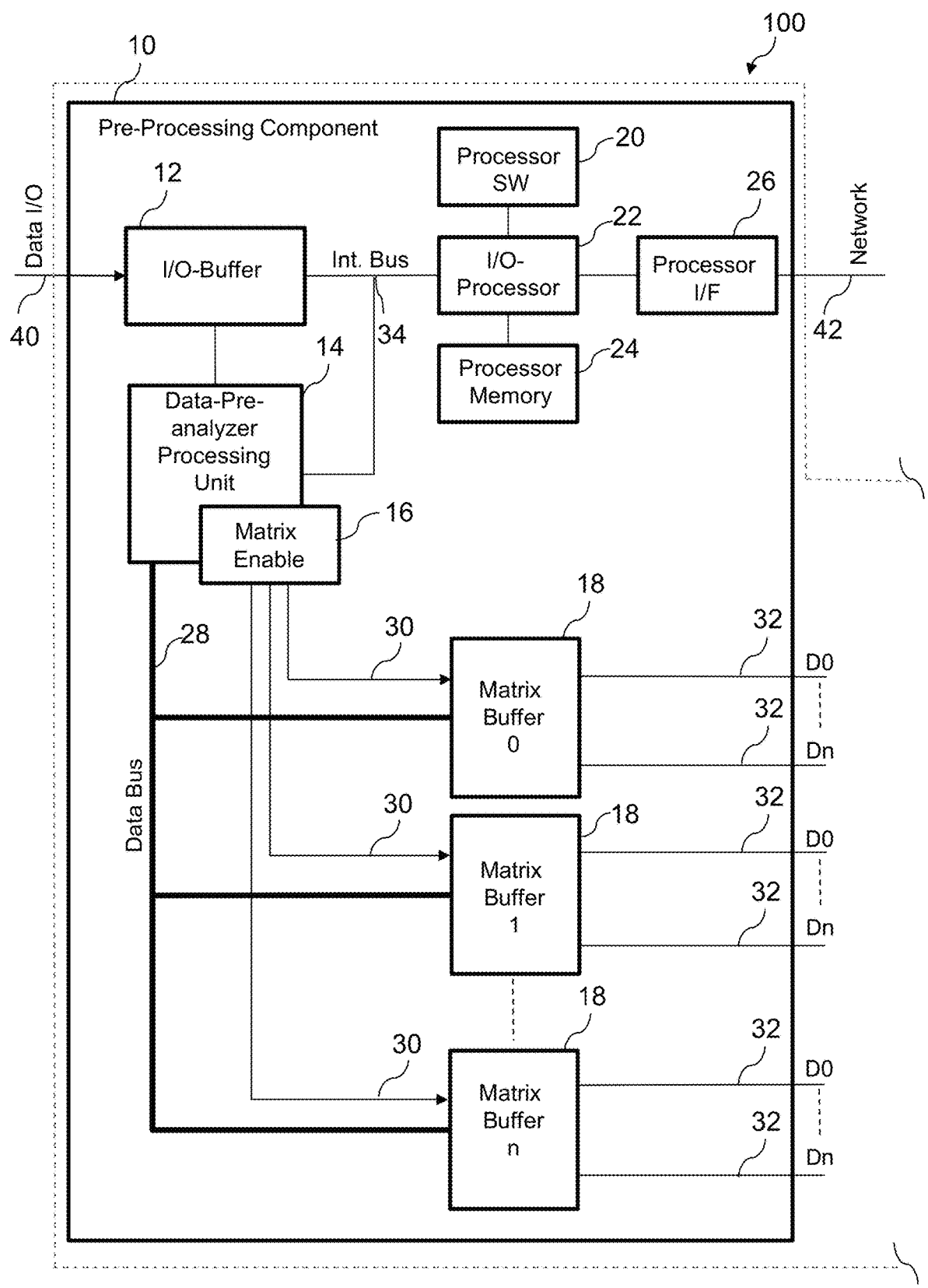
FIG. 2 depicts a pre-processing component of the device, according to an embodiment of the invention.
Figure 3:
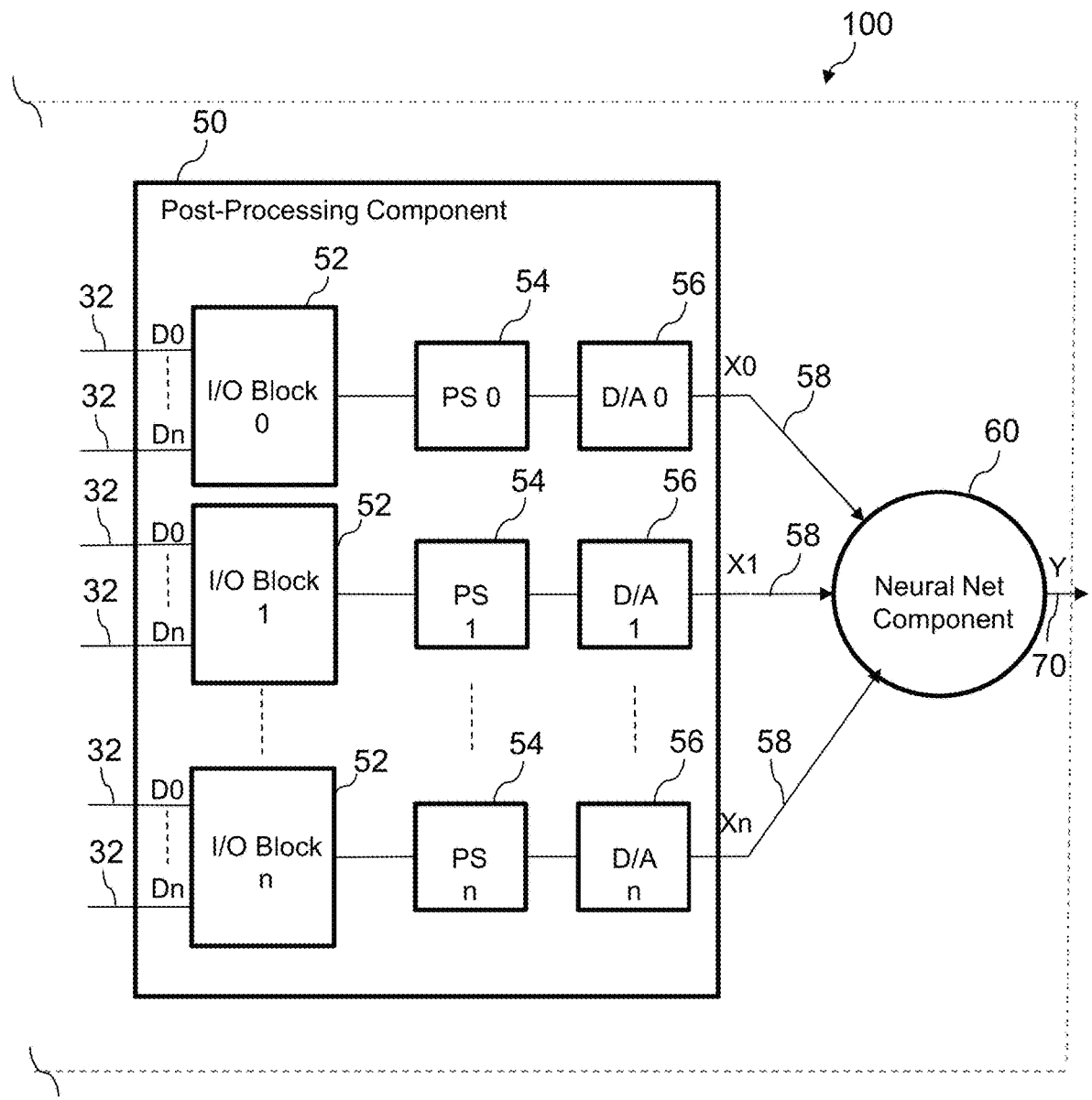
FIG. 3 depicts a post-processing component for an analogue neural network component of the device, according to an embodiment of the invention.
Figure 4:
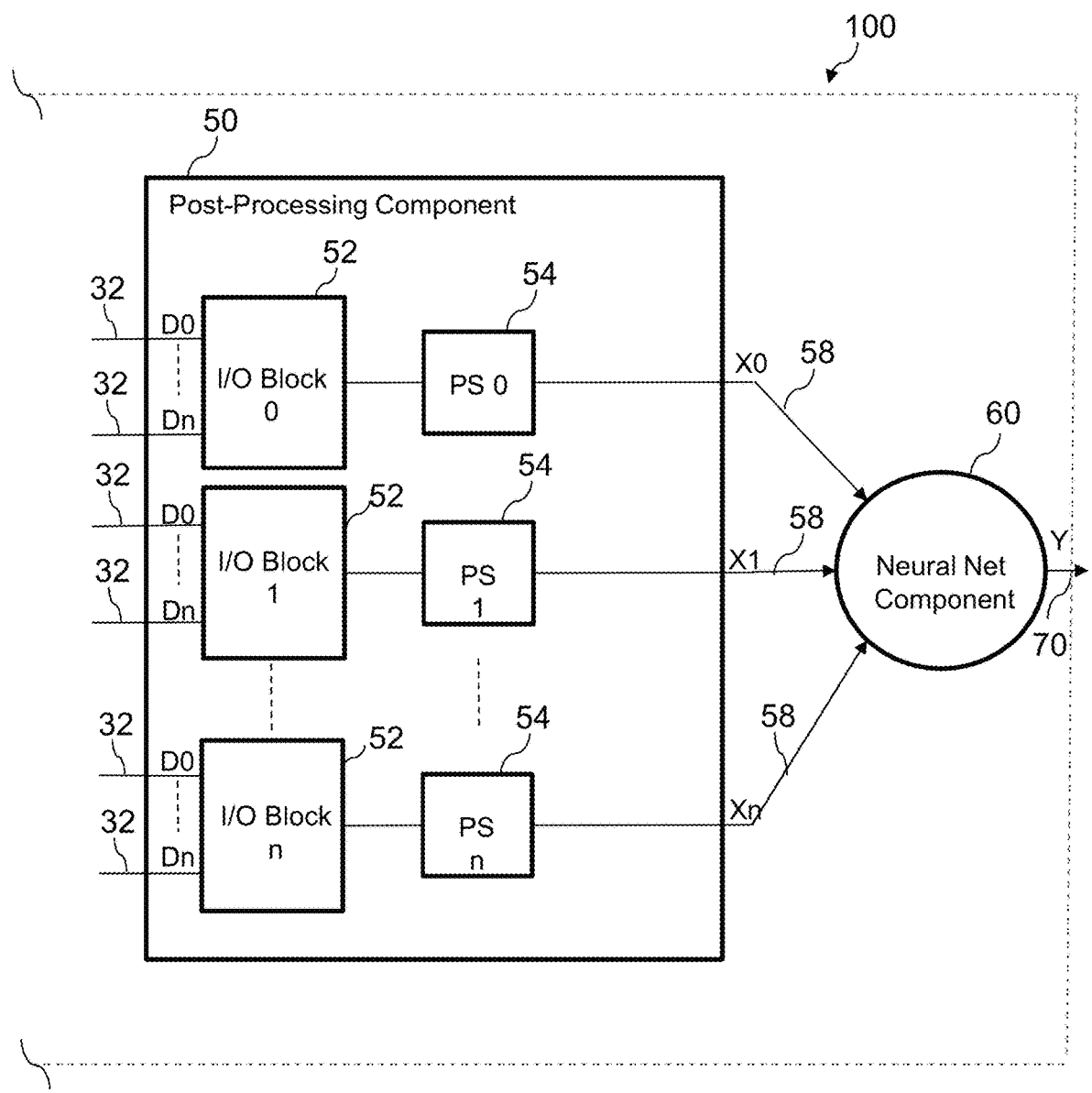
FIG. 4 depicts a post-processing component for a digital neural network component of the device, according to a further embodiment of the invention.

The device 100 for filtering data from a data stream 40 can comprise a pre-processing component 10, a post-processing component 50, and a neural network component 60, as illustrated in FIGS. 2-4.

To perform real-time classification of the data stream 40, device 100 includes, according to an embodiment of the invention, hardware based on a "classical" von Neumann type data processing unit that can modify the data in a way that it can be analyzed by a subsequent non-von Neumann type hardware neural net (NN). An advantage of the neural net is that it can operate simultaneously on parallel vector processes to speed up the classification tasks. However, the neural net can require a defined format for the input data vectors.

FIG. 2 depicts the pre-processing component 10 of the device 100, according to an embodiment of the invention. FIG. 3 depicts the post-processing component 50 for an analogue neural network component 60 of the device 100, according to an embodiment of the invention.

A data pre-analyzer processing unit 14 of the pre-processing component 10 modifies the incoming data stream 40 into a correct vector format with a dimension equal to n, where n is the number of rows and columns of the selection configuration matrix. Subsequently, the data is post-processed as needed by a set of parallel processing element processors (e.g., processing units) 54 of the post-processing component 50. The tasks for these processing units 54 can be, for example, normalization, pre-filtering, outlier detection, identifying focus areas, and/or the like. The data vectors will then be transferred to the neural network component 60 for final ultra-fast classification.

In some embodiments, it would be possible to use dynamically reconfigurable processing elements for the data conditioning as well as for the NN processing to dynamically adjust vector dimension as an adaptation or flexibilization process.

The data protocol coming from each sensor 82 comprises the following information: a sensor identifier, a sensor class, a data identifier, and load data. The incoming data blocks from the sensors 82 can be separated according to sensor class and sensor identifier. According to embodiments of the invention, based on the data protocol, the device 100 may build matrices using the load data. These matrices may be fed into the neural network component 60 for real-time processing and classification. The pre-processing component 10 may perform the data separation according to sensor class. The matrix can be built based on the data identifier of the data protocol. The post processing component 50 may perform operations like normalization etc. on the matrix. These operation(s) can make the data usable for the subsequent neural network component 60.

The pre-processing component 10 is configured to receive the incoming data stream 40 and to provide the data to the post-processing component 50. The post-processing component 50 is configured to receive the data from the pre-processing component 10 and to provide the data to the neural network component 60. The neural network component 60 is configured to classify the data and to filter the data based on the classification(s).

The pre-processing component 10 is configured to separate the data in chunks and to store the data chunks in accordance with a selection configuration matrix in a set of different matrix buffers 18 (e.g., matrix buffer 0, matrix buffer 1 . . . matrix buffer n). The post-processing component 50 comprises multiple processing units 54 (e.g., PS 0, PS 1 . . . PS n), each processing unit 54 being associated with one of the matrix buffers 18. Each processing unit 54 is configured to receive the data chunks from its associated matrix buffer 18, to process the data chunks, and to provide the processed data chunks as inputs 58 to the neural network component 60.

Returning to FIG. 2, the incoming data stream 40 is stored in an I/O-buffer 12 of the pre-processing component 10 and then forwarded to a subsequent data pre-analyzer processing unit 14. The I/O buffer 12 is connected via an internal bus 34 to an I/O processor 22, which comprises a processor software 20 and a processor memory 24 for controlling the I/O processes of the pre-processing component 10. The pre-processing component 10 (e.g., I/O processor 22) is connected via a processor interface 26 to an external network 42 for providing software variability of the system.

The data can be separated in the data pre-analyzer processing unit 14 into chunks which are transferred via a data bus 28 to matrix buffers 18 in accordance with a selection configuration matrix. The data bus 28 may be a serial or a parallel bus. The matrix buffers may be configured as 64-byte or 128-byte buffers, for example, but other data widths can also be possible. The selection configuration matrix can be scalable in the dimension n of rows and columns of the matrix buffers according to the configuration of the device 100. Thus, the number n of matrix buffers 18 may vary as well as the number of I/O blocks 52, processor units 54, and digital-to-analogue converters 56 of the post-processing component 50 accordingly.

The matrix buffer filling process is enabled by a matrix enable unit 16 via a matrix enable signal 30. The selection configuration matrix is based on the meta data, and in particular, on the sensor class and/or the sensor identifier. There is one matrix buffer 18 per matrix entry. As soon as all matrix buffers 18 are filled up, the complete set of matrix data is transferred to the post-processing component 50 for post processing. The data chunks are transferred from the pre-processing component 10 to the post-processing component 50 in a synchronized way as soon as all matrix buffers 18 are filled up via signal lines 32.

The post-processing component 50 comprises multiple I/O blocks 52, with each I/O block 52 (e.g., I/O block 0, I/O block 1 . . . I/O block n) being associated to a matrix buffer 18 (e.g., matrix buffer 0, matrix buffer 1 . . . matrix buffer n), one I/O block 52 per matrix entry. The I/O blocks 52 are configured to receive the data chunks via the signal lines 32 from the matrix buffers 18 after the matrix buffers 18 are filled up and transfer the data chunks in a synchronized way at the same time to the processing units 54.

Each of the processing units 54 is configured to receive the data chunks from an associated I/O block 52 after it is filled up. The processing units 54 are configured to modify the received data chunks in accordance with post-processing rules, for example, to perform operations on the data chunks such as at least one of the operation of normalization, pre-filtering, outlier detection, focus area identification, and/ or the like. The processing units 54 are further configured to transfer the data chunks of all the processing units 54 in a synchronized way to the neural network component 60.

In some embodiments, the neural network component 60 may be configured as an analogue neural network. In such embodiments, the post-processing component 50 can comprise multiple digital-to-analogue converters 56, each digital-to-analogue converter 56 (e.g., D/A 0, D/A 1 . . . D/A n) being associated to one of the processing units 54 (e.g., PS 0, PS 1 . . . PS n). Further, the processing units 54 can be configured to prepare the data chunks for input to the digital-to-analogue converters 56. For example, the preprocessed and post-processed digital information vector of data may be converted into a set of analogue signals as input to the non-von Neumann type neural network component 60.

As an analogue neural network component 60, e.g., a chip developed for brain-inspired multiscale computation in neuromorphic hybrid systems may be used.

After conversion of the data chunks, the digital-to-analogue converters 56 transfer the analogue data 58 in a synchronized way as a weighted input to the neural network component 60.

FIG. 4 depicts a post-processing component 50 for a digital neural network component 60 of a device 100 according to a further embodiment of the invention. In this embodiment, the digital-to-analogue converters of the previous embodiment of post-processing component 50 (e.g., FIG. 3) are omitted. The remaining functions of the post-processing component 50 illustrated in FIG. 4 are similar to those described with regard to FIG. 3.

Figure 5:
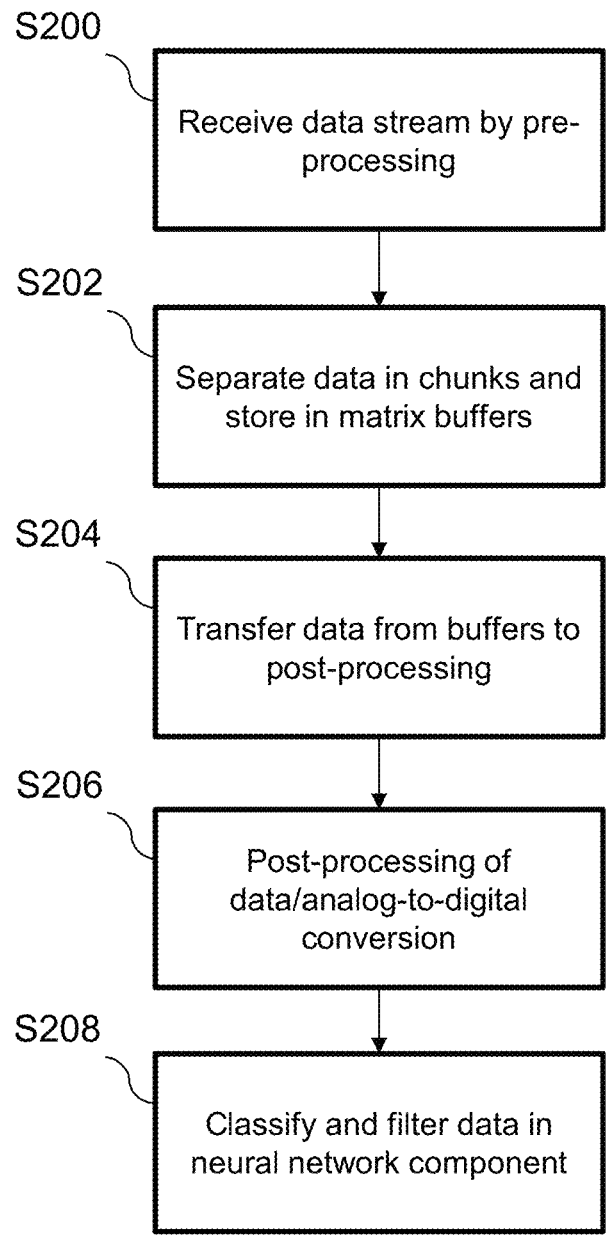
FIG. 5 depicts an overall flow chart of a method for filtering data from a data stream, according to an embodiment of the invention.

FIG. 5 depicts an overall flow chart of the method for filtering data from a data stream according to an embodiment of the invention as depicted in FIGS. 1-3.

As illustrated in the flow chart of FIG. 5, operations begin at operation S200, where the data stream (e.g., data stream 40) is received, for example, by the pre-processing component 10 of device 100. The data stream 40 can include data from multiple sensors (e.g., sensors 82) and the data from each sensor can include meta data and load data, the meta data being related to the sensor and the load data. In some embodiments, the meta data may include a sensor identifier, a sensor class, a data identifier, and/or the like.

Processing proceeds to operation S202, where the data in the data stream are separated into chunks and stored in a set of matrix buffers (e.g., matrix buffers 18) according to a selection configuration matrix, for example, based on the meta data provided in the data stream. In some embodiments, the selection configuration matrix may be based on a sensor class and/or a sensor identifier.

Processing proceeds to operation S204, where the data chunks are transferred from the matrix buffers (e.g., matrix buffers 18) to a post-processing component (e.g., postprocessing component 50) in a synchronized way as soon as all the matrix buffers are filled up. The received data chunks can be modified by the processing units in accordance with post-processing rules to perform operations on the data chunks.

Processing proceeds to operation S206, where the data chunks are processed by the multiple processing units (e.g., processing units 54) of the post-processing component in accordance with post-processing rules, for example, for normalization, pre-filtering, outlier detection, focus areas identification, and/or the like. Then, in embodiments having an analogue neural network component, the processed data in the processed data chunks can be converted to analogue data, for example, by a set of digital-to-analogue converters associated with the multiple processing units. The converted analogue data can be transferred to the analogue neural network component (e.g., neural network component 60). In some embodiments, the analogue data can be provided to the analogue neural network component as weighted inputs. Alternatively, in embodiments including a digital neural network component, the processed data can be transferred to the digital neural network component without conversion.

The data chunks are provided to the I/O blocks (e.g., I/O blocks 52) from the matrix buffers (e.g., matrix buffers 18) after the matrix buffers are filled up. The data chunks are transferred to the multiple processing units (e.g., processing units 54) of the post-processing component in a synchronized way. The data chunks are received by each processing unit from an associated I/O block after the associated I/O block is filled up. The processed data chunks are prepared by the multiple processing units (e.g., processing units 54) for input to digital-to-analogue converters (e.g., digital-to-analogue converters 56) which are included in the post-processing component. Each digital-to-analogue converter is associated to one of the processing units. The processed data chunks of all the processing units are transferred in a synchronized way to the neural network component (e.g., neural network component 60). The analogue data may be transferred by the digital-to-analogue converters to the neural network component as weighted inputs and are transferred to the neural network component in a synchronized way.

Processing proceeds to operation S208, where the neural network component (e.g., neural network component 60) determines classifications for the data included in the processed data chunks and the data is filtered based on the classification(s) in the neural network component. In some embodiments, the filtered data can be labelled (e.g., via meta data, etc.) to provide for storage of the filtered data, for example, in a hierarchical storage unit. In some embodiments, based on the classification of the data, some of the data provided in the data stream may be discarded (e.g., not sent for storage, etc.), for example, where the data has little or no relevance and/or the like.

Figure 6:
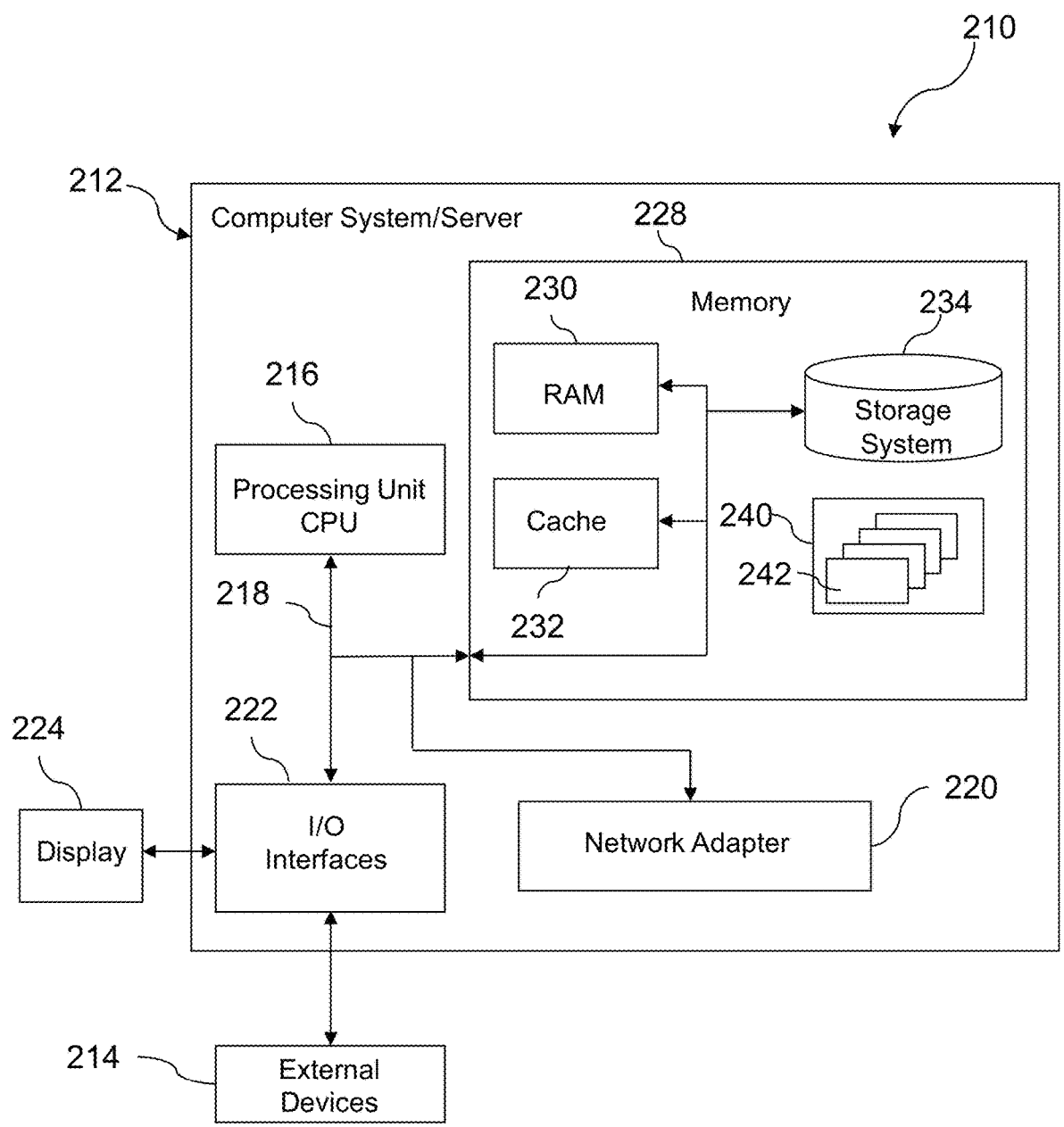
FIG. 6 depicts an example embodiment of a data processing system for executing a method, according to an embodiment of the invention.

Referring now to FIG. 6, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and/or the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration only and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device for filtering data from a data stream, comprising:
    a pre-processing component;
    a post-processing component;
    a neural network component;
    the pre-processing component being configured to receive data from an incoming data stream of one or more sensors and to provide the data to the post-processing component;
    the post-processing component being configured to receive the data and to provide the data to the neural network component;
    the neural network component being configured to classify the data, to filter the data based on the classification of the data, to discard filtered-out data, and to label the filtered data for storage;
    wherein the pre-processing component is configured to separate the data into data chunks and to store the data chunks in accordance with a selection configuration matrix in a set of different matrix buffers; and wherein the post-processing component comprises multiple processing units, each processing unit associated to one of the matrix buffers, the processing units further being configured to receive the data chunks from the associated matrix buffers of the data chunks, to process the data chunks, and to provide the processed data chunks as inputs to the neural network component.

2. The device according to claim 1, wherein the one or more sensors comprise multiple sensors, and wherein the data from each sensor comprises meta data and load data, the meta data being related to the sensor and the load data.

3. The device according to claim 2, wherein the meta data comprises a sensor identifier, a sensor class, and a data identifier.

4. The device according to claim 1, wherein the filtered data from the neural network component is provided to a storage device.

5. The device according to claim 1, wherein the data chunks are transferred from the pre-processing component to the post-processing component in a synchronized way once all buffers are filled up.

6. The device according to claim 1, wherein the processing units are configured to modify the received data chunks in accordance with post-processing rules to perform operations on the data chunks, wherein the operations comprise one or more operations selected from the group consisting of normalization, pre-filtering, outlier detection, and focus area identification.

7. The device according to claim 1, wherein the post-processing component comprises multiple I/O blocks, each I/O block being associated to a matrix buffer, wherein the I/O blocks are configured to receive data chunks from the matrix buffers after the matrix buffers are filled up and transfer the data chunks in a synchronized way to the processing units.

8. The device according to claim 1, wherein the processing units are configured to receive the data chunks from an associated I/O block after the associated I/O block is filled up and to transfer the data chunks of the processing units in a synchronized way to the neural network component.

9. The device according to claim 1, wherein the neural network component is configured as an analogue neural network.

10. The device according to claim 1, wherein the post-processing component comprises multiple digital-to-analogue converters, each digital-to-analogue converter being associated to one of the processing units, wherein the processing units are configured to prepare the data chunks for input to the digital-to-analogue converters, and wherein the digital-to-analogue converters are configured to transfer analogue data in a synchronized way as a weighted input to the neural network component.

11. The device according to claim 3, wherein the selection configuration matrix is based on the sensor class and/or the sensor identifier.

12. The device according to claim 1, wherein the selection configuration matrix is scalable in a dimension of rows and columns.

13. A computer-implemented method comprising:
receiving data from an incoming data stream of one or more sensors;
separating the data into data chunks and storing the data chunks in accordance with a selection configuration matrix in a set of different matrix buffers until the matrix buffers are filled up;
processing the data chunks by multiple processing units, each processing unit associated to a matrix buffer of the matrix buffers via an I/O block;
providing the processed data chunks as inputs to a neural network component;
classifying the data and filtering the data based on a classification of the data by the neural network component; and
labelling the filtered data for storage.

14. The computer-implemented method according to claim 13, wherein the one or more sensors comprise multiple sensors, wherein the data from each sensor comprises meta data and load data, the meta data being related to the sensor and the load data, and wherein the meta data comprises a sensor identifier, a sensor class, and a data identifier.

15. The computer-implemented method according to claim 13, further comprising providing the filtered data to a storage device for storage.

16. The computer-implemented method according to claim 13, further comprising providing the data chunks for processing in a synchronized way once all the matrix buffers are filled up.

17. The computer-implemented method according to claim 13, wherein processing the data chunks by the multiple processing units comprises modifying the data chunks in accordance with post-processing rules to perform one or more operations selected from the group consisting of normalization, pre-filtering, outlier detection, and focus area identification.

18. The computer-implemented method according to claim 13, further comprising:
providing the data chunks for processing from each I/O block after the I/O block is filled up; and
providing the processed data chunks to the neural network component in a synchronized way.

19. The computer-implemented method according to claim 13, wherein the neural network component is configured as an analogue neural network; and
wherein the method further comprises:
converting the processed data chunks into analogue data via a set of digital-to-analogue converters, each digital-to-analogue converter of the set of digital-to-analogue converters being associated to one of the multiple processing units; and
providing the analogue data as weighted inputs to the neural network component in a synchronized way.

20. A computer program product, the computer program product comprising a computer readable storage medium having program instructions embodied thereon, the program instructions executable by a computer system to cause the computer system to perform operations comprising:
receiving data from an incoming data stream of one or more sensors;
separating the data into data chunks and storing the data chunks in accordance with a selection configuration matrix in a set of different matrix buffers until the matrix buffers are filled up;
processing the data chunks by multiple processing units, each processing unit associated to a matrix buffer of the matrix buffers via an I/O block;
providing the processed data chunks as inputs to a neural network component;
classifying the data and filtering the data based on a classification of the data by the neural network component; and
labelling the filtered data for storage.

* * * * *